(12) United States Patent
Ichikawa et al.

(10) Patent No.: US 12,346,478 B2
(45) Date of Patent: Jul. 1, 2025

(54) SECURE COMPUTATION SYSTEM, SECURE COMPUTATION APPARATUS, METHOD, AND PROGRAM

(71) Applicant: NIPPON TELEGRAPH AND TELEPHONE CORPORATION, Tokyo (JP)

(72) Inventors: Atsunori Ichikawa, Tokyo (JP); Koki Hamada, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 139 days.

(21) Appl. No.: 18/552,075

(22) PCT Filed: Apr. 19, 2021

(86) PCT No.: PCT/JP2021/015927
§ 371 (c)(1),
(2) Date: Sep. 22, 2023

(87) PCT Pub. No.: WO2022/224319
PCT Pub. Date: Oct. 27, 2022

(65) Prior Publication Data
US 2024/0176908 A1 May 30, 2024

(51) Int. Cl.
*G06F 21/62* (2013.01)
*G06F 7/58* (2006.01)

(52) U.S. Cl.
CPC .......... *G06F 21/6245* (2013.01); *G06F 7/582* (2013.01)

(58) Field of Classification Search
CPC ...... G06F 21/6245; G06F 7/582; G06F 21/70; H04L 9/0662; H04L 2209/08; H04L 9/085; H04L 2209/46; H04W 12/02
See application file for complete search history.

(56) References Cited

U.S. PATENT DOCUMENTS

| | | | |
|---|---|---|---|
| 11,381,253 B1* | 7/2022 | Asadi | H03M 13/1148 |
| 2020/0028615 A1* | 1/2020 | Jang | H03M 13/155 |
| 2022/0085829 A1* | 3/2022 | Asadi | H03M 13/096 |

OTHER PUBLICATIONS

Atsunori Ichikawa et al., "Optimal concealment Hash on 3-Party Computation and Sublogarithmically Efficient Oblivious RAM", Symposium on Cryptography and Information Security (SCIS), Jan. 28-31, 2020 Proceedings (2020).

(Continued)

*Primary Examiner* — Mohammad W Reza
(74) *Attorney, Agent, or Firm* — IPUSA, PLLC (57) ABSTRACT

A secure computation system includes first, second, and third secure-computation-apparatuses each having a tripartite-share of a concealed input vector. The first secure-computation-apparatus converts its tripartite-share into a bipartite-share with the third secure-computation-apparatus; calculates a third vector obtained by subtracting a second permutation of a first vector and a second vector from its permutation of its bipartite-share; and transmits the third vector and the second permutation to the second secure-computation-apparatus. The third secure-computation-apparatus converts its tripartite-share into a bipartite-share with the first secure-computation-apparatus; calculates a fourth vector obtained by adding the first vector to a first permutation of its bipartite-share; transmits the fourth vector to the third secure-computation-apparatus: set the second vector as a bipartite-share with the second secure-computation-apparatus. The second secure-computation-apparatus sets a vector obtained by adding the second permutation of the fourth vector to the third vector, as a bipartite-share with the third secure-computation-apparatus.

8 Claims, 6 Drawing Sheets

(56) References Cited

OTHER PUBLICATIONS

Koki Hamada et al., "Constant-Round Secure Computation Sequence Access Algorithm with Sublinear Local Computation amount", Symposium on Cryptography and Information Security (SCIS), Jan. 22-25, 2019, Proceedings (2019).
A. Shamir, "How to share a secret", Commun. ACM, vol. 22, No. 11, pp. 612-613, Nov. 1979.
M. Ito et al., "Secret sharing schemes realizing general access structures", Proceedings of the IEEE Global Telecommunication Conference, Globecom 87, pp. 99-102, 1987.
Naoto Kiribuchi et al., "Programmable secure computation library MEVAL3", Symposium on Cryptography and Information Security (SCIS), Jan. 23-26, 2018, Proceedings (2018).
K. Chida et al., "High-throughput secure AES computation", In WAHC@CCS 2018, pp. 13-24, Oct. 19, 2018.
A. Kirsch et al., "More robust hashing: Cuckoo hashing with a stash", In ESA, pp. 611-622, 2008.
K. Chida et al., "An efficient secure three-party sorting protocol with an honest majority", CryptologyePrint Archive, Report 2019/695 (2019), https://eprint.iacr.org/2019/695.
P. Mohassel et al., "Fast database joins and PSI for secret shared data", Proceedings of the 2020 ACM SIGSAC Conference on Computer and Communications Security (CCS '20), Association for Computing Machinery, NY, USA, Sep. 9, 2020.

\* cited by examiner

SECURE COMPUTATION SYSTEM, SECURE COMPUTATION APPARATUS, METHOD, AND PROGRAM

TECHNICAL FIELD

The present invention relates to a secure computation system, a secure computation apparatus, a method, and a program.

BACKGROUND ART

Secure computation is a useful technology that is known to perform various computations at high speed while concealing data. In many analyses, an operation of searching for and extracting data that matches specific conditions from a data set (vector) is important processing that is frequently used. In secure computation, an operation of searching becomes an operation of finding a location matching the conditions by simply searching for an entire vector in each reference since data reference while concealing search conditions (for example, a search keyword) is necessary, and there is a problem that a large amount of calculation and communication are required.

To address this problem, a technology capable of greatly reducing a reference cost by constructing a special data structure in advance using a permutation or sorting is known (for example, Non Patent Literature 1 and Non Patent Literature 2). How to construct and refer to such a data structure at high speed is important for data reference in secure computation.

In construction of the data structure as described above, concealment permutation capable of rearranging a vector while concealing a permutation method for participants (parties) of secure computation plays an important role. Various methods are known as a method of realizing a concealment permutation, but a method of permutating a vector while concealing both the vector and the permutation, for example, under the premise that parties share a pre-concealed permutation and a random number sequence, is known. Further, for example, a method of concealing a vector for all parties under the premise that one party has a permutation as plaintext, and permutating the vector while concealing the permutation for parties other than the party having the permutation is known.

CITATION LIST

Non Patent Literature

Non Patent Literature 1: Atsunori Ichikawa, Koki Hamada, Ryo Kikuchi, Dai Ikarashi. Optimal concealment Hash on 3-Party Computation and Sublogarithmically Efficient Oblivious RAM. Symposium on Cryptography and Information Security (SCIS) 2020 Proceedings (2020).

Non Patent Literature 2: Koki Hamada, Atsunori Ichikawa. Constant-Round Secure Computation Vector Access Algorithm with Sublinear Local Computation amount. Symposium on Cryptography and Information Security (SCIS) 2019 Proceedings (2019).

SUMMARY OF INVENTION

Technical Problem

However, in the related arts (for example, Non Patent Literature 1 and Non Patent Literature 2), since random permutation (shuffle) or partial sorting of a vector is executed multiple times, there is a problem that actual efficiency is poor, or although actual efficiency is good, there is a vulnerability to unauthorized reference.

An embodiment of the present invention has been made in view of the above points, and an object of the embodiment of the present invention is to perform efficient and safe concealed vector permutation in secure computation by three parties.

Solution to Problem

To achieve the above object, a secure computation system according to an embodiment is a secure computation system including a first secure computation apparatus, a second secure computation apparatus, and a third secure computation apparatus each having a tripartite share of a concealed input vector, wherein the first secure computation apparatus includes a first conversion unit configured to convert its own tripartite share into a bipartite share with the third secure computation apparatus; a first calculation unit configured to calculate a third vector obtained by subtracting, from a result of applying its own permutation to its own bipartite share, a result of applying a second permutation determined according to the permutation to a first vector determined by a predetermined method and a second vector determined by a predetermined method; and a first transmission unit configured to transmit the third vector and the second permutation to the second secure computation apparatus, the third secure computation apparatus includes a second conversion unit configured to convert its own tripartite share into a bipartite share with the first secure computation apparatus; a second calculation unit configured to calculate a fourth vector obtained by adding the first vector to a result of applying a first permutation determined according to the permutation to its own bipartite share; a second transmission unit configured to transmit the fourth vector to the third secure computation apparatus; a first output unit configured to set the second vector as a bipartite share, with the second secure computation apparatus, of a result of applying the permutation to the input vector, and the second secure computation apparatus includes a second output unit configured to set a vector obtained by adding a result of applying the second permutation to the fourth vector to the third vector, as a bipartite share, with the third secure computation apparatus, of the result of applying the permutation to the input vector.

Advantageous Effects of Invention

It is possible to perform efficient and secure concealed vector permutation in secure computation by three parties.

DESCRIPTION OF EMBODIMENTS

Hereinafter, an embodiment of the present invention will be described. In the present embodiment, a secure computation system 1 capable of performing efficient and secure concealed vector permutation by making information obtained by each party asymmetrical in secure computation by three parties will be described. Further, a case in which a construction of any data structure using a concealed vector permutation (a data structure in a vector format in which data and a reference position at the time of accessing the data are concealed (hereinafter also referred to as a reference position concealment vector)), and referring to data structure are performed by the secure computation system 1 according to the present embodiment will be described.

Hereinafter, it is assumed that the three parties are denoted as $P_1$, $P_2$, and $P_3$, and $P_1$ is a party having a permutation.

Preparation

First, some symbols, terms, concepts, and the like are prepared.

<<Tripartite Data Concealment>>

A result of concealing plaintext x and sharing the plaintext x between three parties is expressed by $$[\![x]\!]_1 [\![x]\!]_2 [\![x]\!]_3.$$ [Math. 1]

In the text of the specification, these are represented as $[x]_1$, $[x]_2$, and $[x]_3$, respectively.

In this case, $[x]_i$ is assumed to be owned by party $P_i$, but hereinafter, "x in a state shared by each party" is abstracted and simply expressed as $[x]$. Each $[x]_i$ is called a fragment or share. Further, it is assumed that the plaintext x can be restored using any two of the three shares $[x]_1$, $[x]_2$, and $[x]_3$, and cannot be restored using one of the shares.

Examples of a technology satisfying the above include secret sharing methods (for example, reference 1 and reference 2), but the present invention is not limited thereto, and any method can be used as long as the method satisfies the same function and security as the secret sharing method.

<<Additive Bipartite Data Concealment>>

A result of concealing the plaintext x and sharing the plaintext x between two parties is represented by $<x>_1$ and $<x>_2$, and particularly, two values thereof are random values satisfying $<x>_1+<x>_2=x$. Each of $<x>_1$ and $<x>_2$ is assumed to be owned by two parties among $P_1$, $P_2$, and $P_3$, but such a state is abstracted and simply indicated as $<x>$. It is also assumed that conversion from $[x]$ to $<x>$ is possible without intervening communication between the parties.

Examples of a technology satisfying the above include secret sharing methods (for example, reference 1 and reference 2), but the present invention is not limited thereto, and any method can be used as long as the method satisfies the same function and security as the secret sharing method.

<<Random Share Generation>>

Processing for generating a share $[r]$ of a random number r without any party knowing the plaintext r is called random share generation. This processing can be realized, for example, with the technology described in Reference 3, and the like on the secret sharing method, but the present invention is not limited thereto, and any technology can be used as long as the technology satisfies the same function and security as such a technology.

<<Pseudo-random Function>>

Hereinafter, it is assumed that a pseudo-random function capable of secure computation is denoted by F, and secure computation of the pseudo-random function is denoted by $F([a], [s])$ for a value $[a]$ of a secret and a key $[s]$. This secure computation processing can be realized, for example, by the technology described in Reference 4, and the like, but the present invention is not limited thereto, and any technology can be used as long as the technology satisfies the same function and security as such a technology.

<<Permutation of Vector>>

Hereinafter, it is assumed that permutation (rearrangement) for any vector having a length m (not based on secure computation) is represented by a bijection π: $\{1, \ldots, m\} \to \{1, \ldots, m\}$, and a vector obtained by applying the permutation n to a vector A is represented by πA. Here, for $A=(A_1, \ldots, A_m)$, $$\pi A = (A_{\pi^{-1}(1)}, \ldots, A_{\pi^{-1}(m)}).$$ [Math. 2]

Further, it is assumed that synthesis between two permutations is represented by a symbol ∘. For example, when $$\pi = \pi_1 \circ \pi_2$$ [Math. 3]

, $\pi A = \pi_2(\pi_1 A)$ is satisfied.

Overall Configuration of Secure Computation System 1

Figure 1:
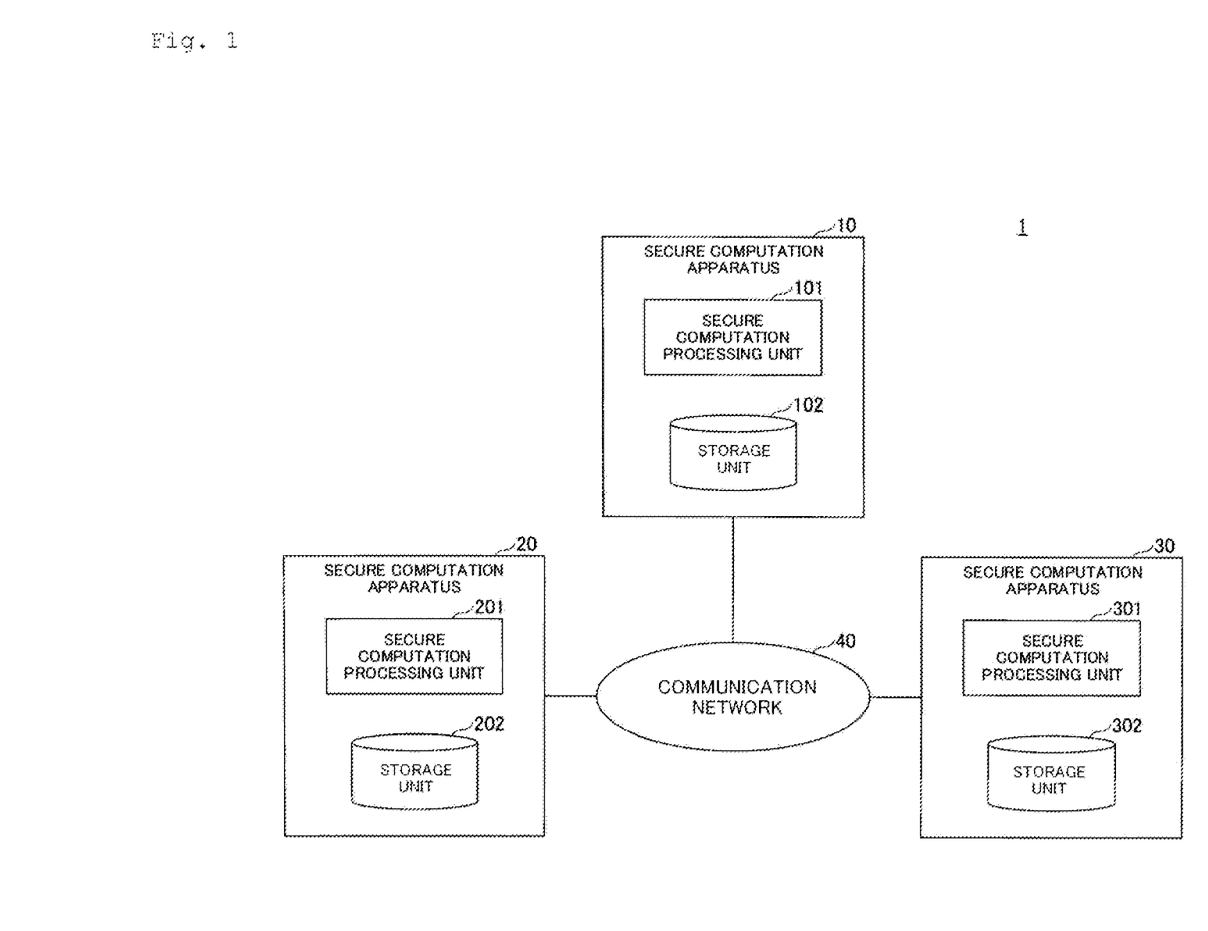
FIG. 1 is a diagram illustrating an example of an overall configuration of a secure computation system according to an embodiment.

Next, an overall configuration of the secure computation system 1 according to the present embodiment will be described with reference to FIG. 1. FIG. 1 is a diagram illustrating an example of the overall configuration of the secure computation system 1 according to the present embodiment.

As illustrated in FIG. 1, the secure computation system 1 according to the present embodiment includes a secure computation apparatus 10, a secure computation apparatus 20, and a secure computation apparatus 30. Further, the secure computation apparatus 10, the secure computation apparatus 20, and the secure computation apparatus 30 are communicatively connected to each other via a communication network 40 such as the Internet.

The secure computation apparatus 10 is a computer or computer system that functions as a party $P_1$ and includes a secure computation processing unit 101 and a storage unit 102. The secure computation processing unit 101 executes various processing for performing concealed vector permutation or construction of a reference position concealment vector. Further, the storage unit 102 stores various types of information (for example, permutation or sharing of vectors) required for execution of various types of processing.

The secure computation apparatus 20 is a computer or computer system that functions as the party $P_2$ and includes a secure computation processing unit 201 and a storage unit 202. The secure computation processing unit 101 executes various processing for performing concealed vector permutation, construction of a reference position concealment vector, and referencing thereof. Further, the storage unit 202 stores various types of information (for example, shares of the vector) required for execution of the various types of processing.

The secure computation apparatus 30 is a computer or computer system that functions as a party $P_3$ and includes a secure computation processing unit 301 and a storage unit 302. The secure computation processing unit 301 executes various processing for performing concealed vector permutation, construction of a reference position concealment vector, and referencing thereof. Further, the storage unit 302 stores various types of information (for example, shares of the vector) required for execution of the various types of processing.

Hardware Configuration of Secure Computation System 1

Next, hardware configurations of the secure computation apparatus 10, the secure computation apparatus 20, and the secure computation apparatus 30 included in the secure computation system 1 according to the present embodiment will be described. The secure computation apparatus 10, the secure computation apparatus 20, and the secure computation apparatus 30 can be realized by, for example, a hardware configuration of a computer 500 illustrated in FIG. 2.

Figure 2:
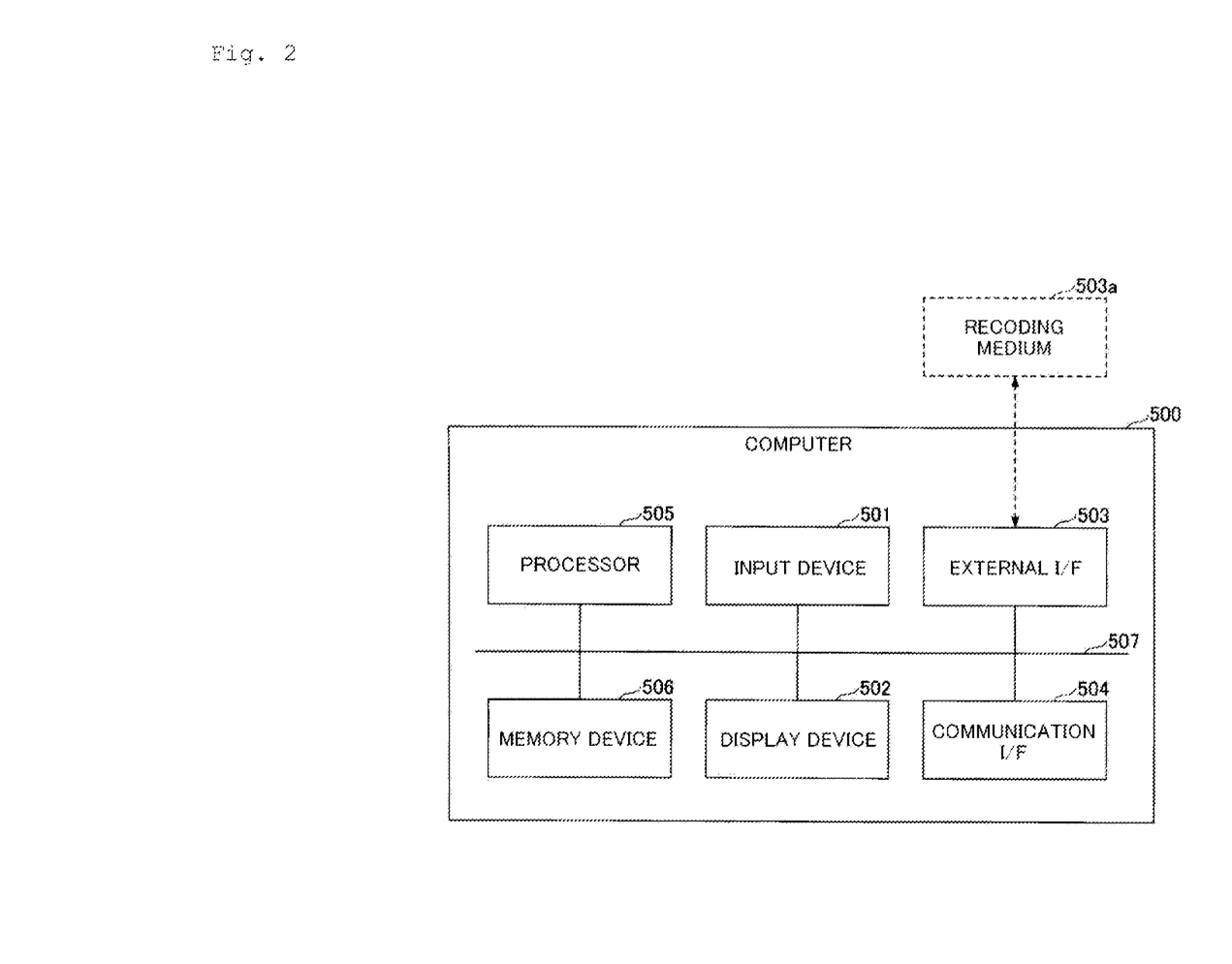
FIG. 2 is a diagram illustrating an example of a hardware configuration of a computer.

The computer 500 illustrated in FIG. 2 includes an input device 501, a display device 502, an external I/F 503, a communication I/F 504, a processor 505, and a memory device 506 as hardware. The respective pieces of hardware are communicatively connected via a bus 507.

The input device 501 is, for example, a keyboard and a mouse, a touch panel, or the like. The display device 502 is, for example, a display. The computer 500 may not include at least one of the input device 501 and the display device 502.

The external I/F 503 is an interface with an external device such as a recording medium 503a. Examples of the recording medium 503a include a compact disc (CD), a digital versatile disk (DVD), a secure digital memory card (SD memory card), and a universal serial bus (USB) memory card.

The communication I/F 504 is an interface for connection to the communication network 40. The processor 505 is, for example, any of various arithmetic devices such as a central processing unit (CPU) and a graphics processing unit (GPU). The memory device 506 is, for example, any of various storage devices such as a hard disk drive (HDD), a solid state drive (SSD), a random access memory (RAM), a read only memory (ROM), and a flash memory.

The secure computation apparatus 10, the secure computation apparatus 20, and the secure computation apparatus 30 according to the present embodiment can realize various processing to be described below by the hardware configuration of the computer 500 illustrated in FIG. 2. The hardware configuration of the computer 500 illustrated in FIG. 2 is an example, and various hardware configurations may be adopted according to, for example, a use of a target to which the secure computation system 1 is applied.

The secure computation processing unit 101 is realized by, for example, processing that one or more programs installed in the secure computation apparatus 10 cause the processor 505 of the computer 500 realizing the secure computation apparatus 10 to execute. Further, the storage unit 102 is realized by the memory device 506 of the computer 500 realizing the secure computation apparatus 10, for example.

Similarly, the secure computation processing unit 201 is realized by, for example, processing that one or more programs installed in the secure computation apparatus 20 cause the processor 505 of the computer 500 realizing the secure computation apparatus 20 to execute. Further, the storage unit 202 is realized by the memory device 506 of the computer 500 realizing the secure computation apparatus 20, for example.

Further, similarly, the secure computation processing unit 301 is realized by, for example, processing that one or more programs installed in the secure computation apparatus 30 cause the processor 505 of the computer 500 realizing the secure computation apparatus 30 to execute. Further, the storage unit 302 is realized by the memory device 506 of the computer 500 realizing the secure computation apparatus 30, for example.

Example 1

Figure 3:
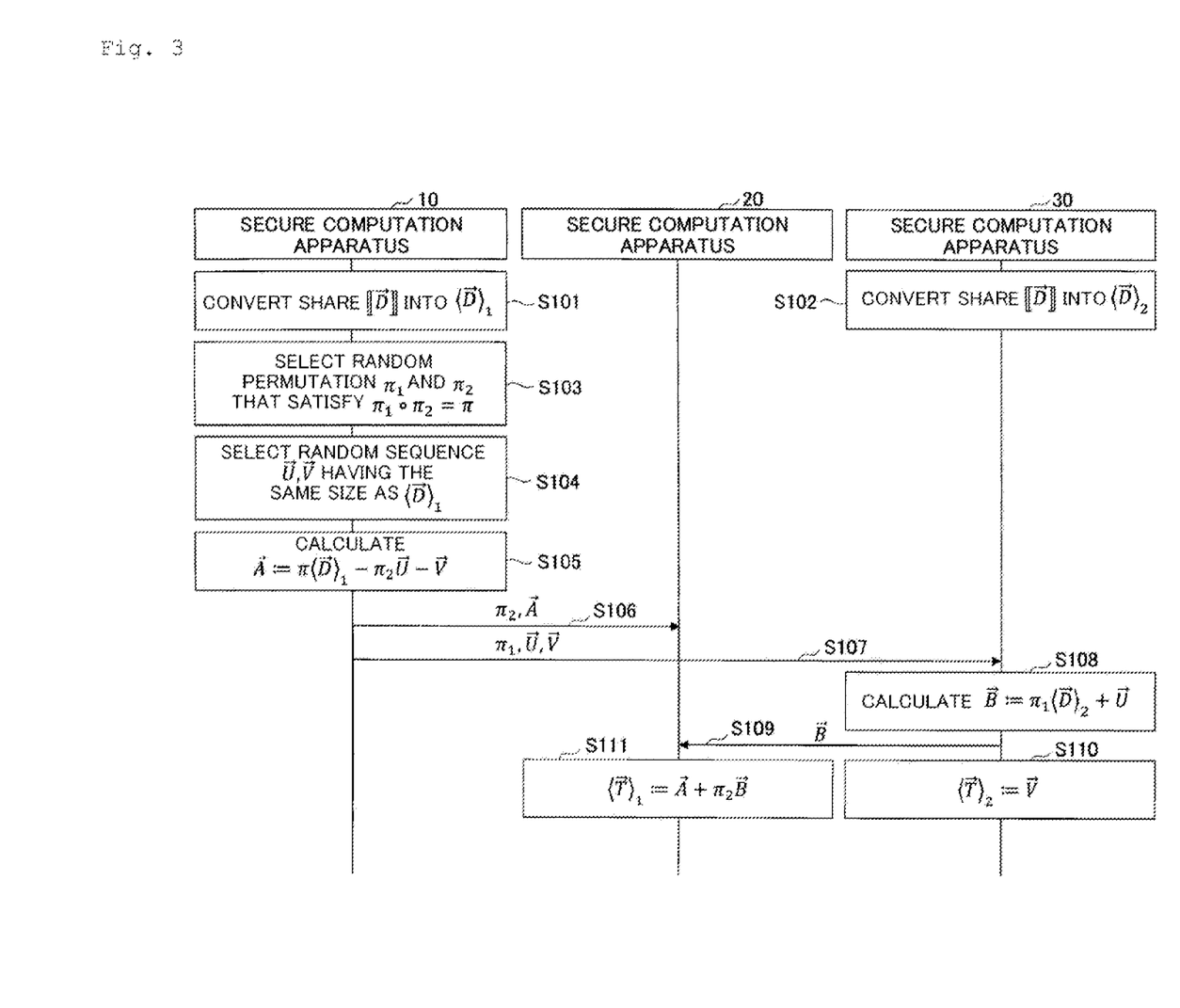
FIG. 3 is a sequence diagram illustrating Example 1.

In the present example, a case in which, when $P_1$ has a permutation $\pi$ of any plaintext and all parties have (or receive) a concealed vector $$[\![ \vec{L} ]\!] := ([\![ D ]\!], \ldots, [\![ D ]\!]),$$ [Math. 4]

the permutation $\pi$ is applied to a share thereof, and only $P_2$ and $P_3$ obtains an additive bipartite share of the permuted vector $$\langle \vec{T} \rangle ; \vec{T} = \pi \vec{D}$$ [Math. 5]

will be described with reference to FIG. 3. FIG. 3 is a sequence diagram illustrating Example 1. Hereinafter, in the text of the specification, an arrow attached directly above a symbol is attached to a left shoulder. For example, Equation 5 above is expressed as $<^{\to}T>$; $^{\to}T = \pi^{\to}D$ in the text of the specification.

The secure computation processing unit 101 of the secure computation apparatus 10 converts the share $[^{\to}D]$ into $<^{\to}D>_1$ (S101). Similarly, the secure computation processing unit 301 of the secure computation apparatus 30 converts the share $[^{\to}D]$ into $<^{\to}D>_2$ (S102). Here, it is assumed that $P_1$ has $<^{\to}D>_1$ and $P_2$ has $<^{\to}D>_2$, but $P_1$ may have $<^{\to}D>_2$ and $P_2$ may have $<^{\to}D>_1$. Hereinafter, it is assumed that $P_1$ has $<^{\to}D>_1$ and $P_2$ has $<^{\to}D>_2$.

Next, the secure computation processing unit 101 of the secure computation apparatus 10 selects random permutations $\pi_1$ and $\pi_2$ that satisfy:

$$\pi_1 \circ \pi_2 = \pi$$ [Math. 6]

(S103). Further, the secure computation processing unit 101 of the secure computation apparatus 10 selects a random vector $^{\to}U$, $^{\to}V$ having the same size as $<^{\to}D>_1$ (S104).

Next, the secure computation processing unit 101 of the secure computation apparatus 10 calculates $^{\to}A := \pi <^{\to}D>_1 - \pi_2{}^{\to}U - {}^{\to}V$ (S105).

The secure computation processing unit 101 of the secure computation apparatus 10 transmits $\pi_2$ and $^{\to}A$ to the secure computation apparatus 20 (S106), and also transmits $\pi_1$, $^{\to}U$ and $^{\to}V$ to the secure computation apparatus 30 (S107).

The secure computation processing unit 301 of the secure computation apparatus 30 calculates $^{\to}B := \pi_1 <^{\to}D>_2 + {}^{\to}U$ (S108), and then transmits $^{\to}B$ to the secure computation apparatus 20 (S109). Further, the secure computation processing unit 301 of the secure computation apparatus 30 determines its own output to be $<^{\to}T>_2 := {}^{\to}V$ (S110).

The secure computation processing unit 201 of the secure computation apparatus 20 determines its own output to be $<^{\to}T>_1 := {}^{\to}A + \pi_2{}^{\to}B$ (S111).

Since in the above protocol $^{\to}A + \pi_2{}^{\to}B = \pi^{\to}D - {}^{\to}V$, $<^{\to}T>_1$ and $<^{\to}T>_2$ are additive bipartite shares of $^{\to}T = \pi^{\to}D$. Further, in the above protocol, the amount of communication is 4×(size of vector $<^{\to}D>$)+2×(size of permutation $\pi$) bits, and the number of rounds is 2. From this, it can be seen that efficient concealed vector permutation can be realized in the present embodiment. Further, since $P_1$, who is an owner of the permutation, does not have $<^{\to}T>$, it can be seen that, for example, a secure concealed vector permutation in which $P_1$ cannot perform (unauthorized) manipulation or information acquisition can be realized.

Therefore, according to the present embodiment, any permutation can be applied to the concealed vector, and a secure reference position concealment vector can be obtained efficiently.

Example 2

Figure 4:
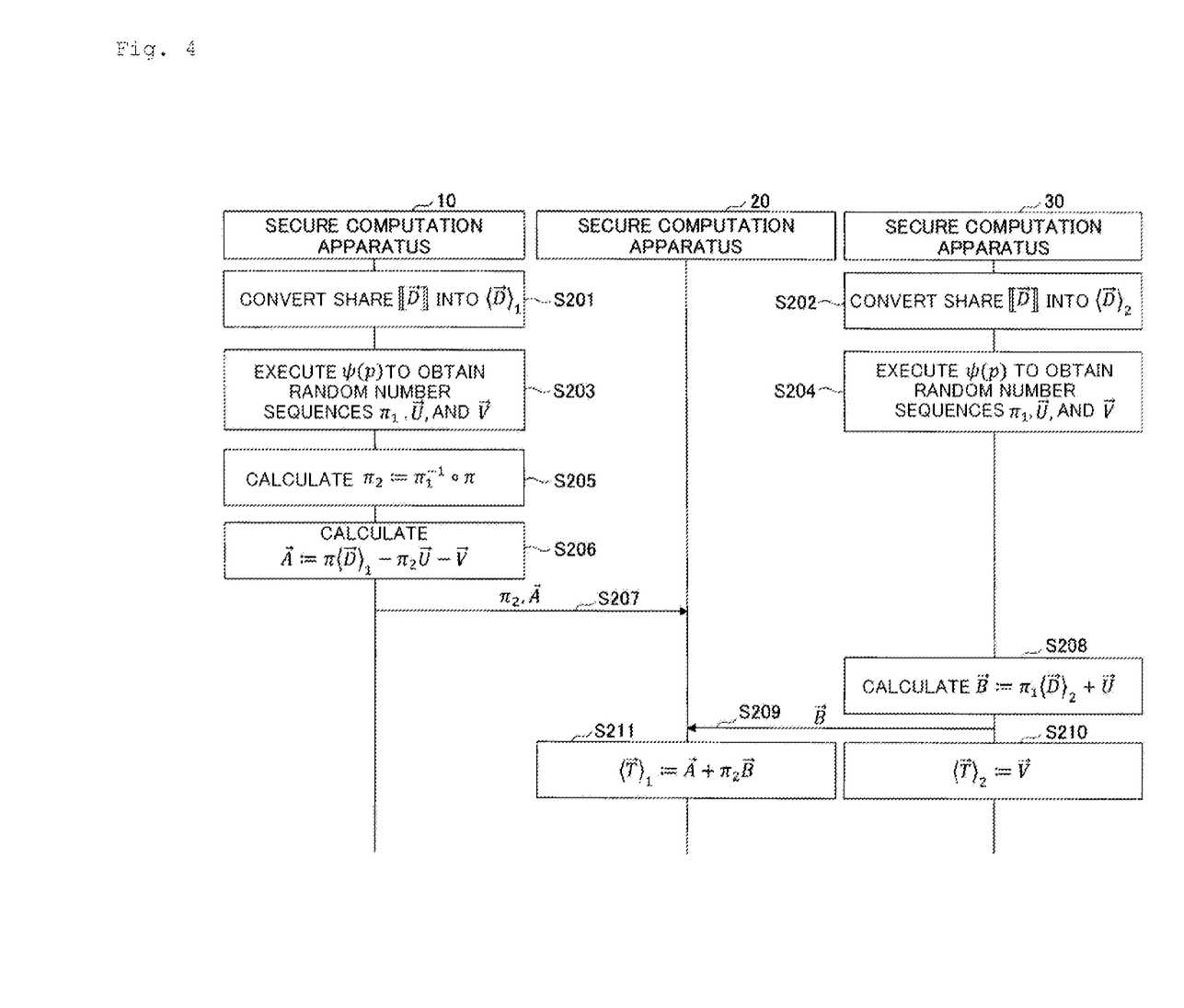
FIG. 4 is a sequence diagram illustrating Example 2.

The present embodiment is an extension of Example 1, and a case in which an amount of communication and the number of rounds are reduced using any cryptographic pseudo-random number generator (not based on secure computation) will be described with reference to FIG. 4. FIG. 4 is a sequence diagram illustrating Example 2. Here, in the present example, it is assumed that $P_1$ and $P_2$ share a common pseudo-random number generator $\varphi$ and an input p thereof in advance. $P_1$ has a permutation $\pi$ of any plaintext, and all parties have any concealed vector $[\vec{D}]$, as in Example 1.

Since S201 to S202 in FIG. 4 are substantially the same as S101 to S102 in Example 1, respectively, description thereof will be omitted.

The secure computation processing unit 101 of the secure computation apparatus 10 executes $\psi(p)$ to obtain random number sequences $\pi_1$, $\vec{U}$, and $\vec{V}$ (S203). Similarly, the secure computation processing unit 301 of the secure computation apparatus 30 executes $\psi(p)$ to obtain random number sequences $\pi_1$, $\vec{U}$, and $\vec{V}$ (S204). That is, $P_1$ and $P_3$ independently execute $\psi(p)$ to obtain common random number sequences $\pi_1$, $\vec{U}$, and $\vec{V}$.

Next, the secure computation processing unit 101 of the secure computation apparatus 10 calculates a permutation:

$$\pi_2 := \pi_1^{-1} \circ \pi \qquad [\text{Math. 7}]$$

(S205).

Next, the secure computation processing unit 101 of the secure computation apparatus 10 calculates $\vec{A} := \pi < \vec{D} >_1 - \pi_2 \vec{U} - \vec{V}$ (S206).

The secure computation processing unit 101 of the secure computation apparatus 10 transmits $\pi_2$ and $\vec{A}$ to the secure computation apparatus 20 (S207).

Since subsequent S208 to S211 are substantially the same as S108 to S111 of Example 1, respectively, description thereof is omitted.

In the present example, any update rule regarding p (for example, update $p \leftarrow p+1$ is performed each time $\psi(p)$ is executed) is shared between $P_1$ and $P_3$, so that p or $\psi$ can be executed repeatedly without re-sharing. This can reduce the amount of communication to $2\times(\text{size of vector} <\vec{D}>)+2\times(\text{size of permutation } \pi)$ bits and the number of rounds to 1.

Example 3

Figure 5:
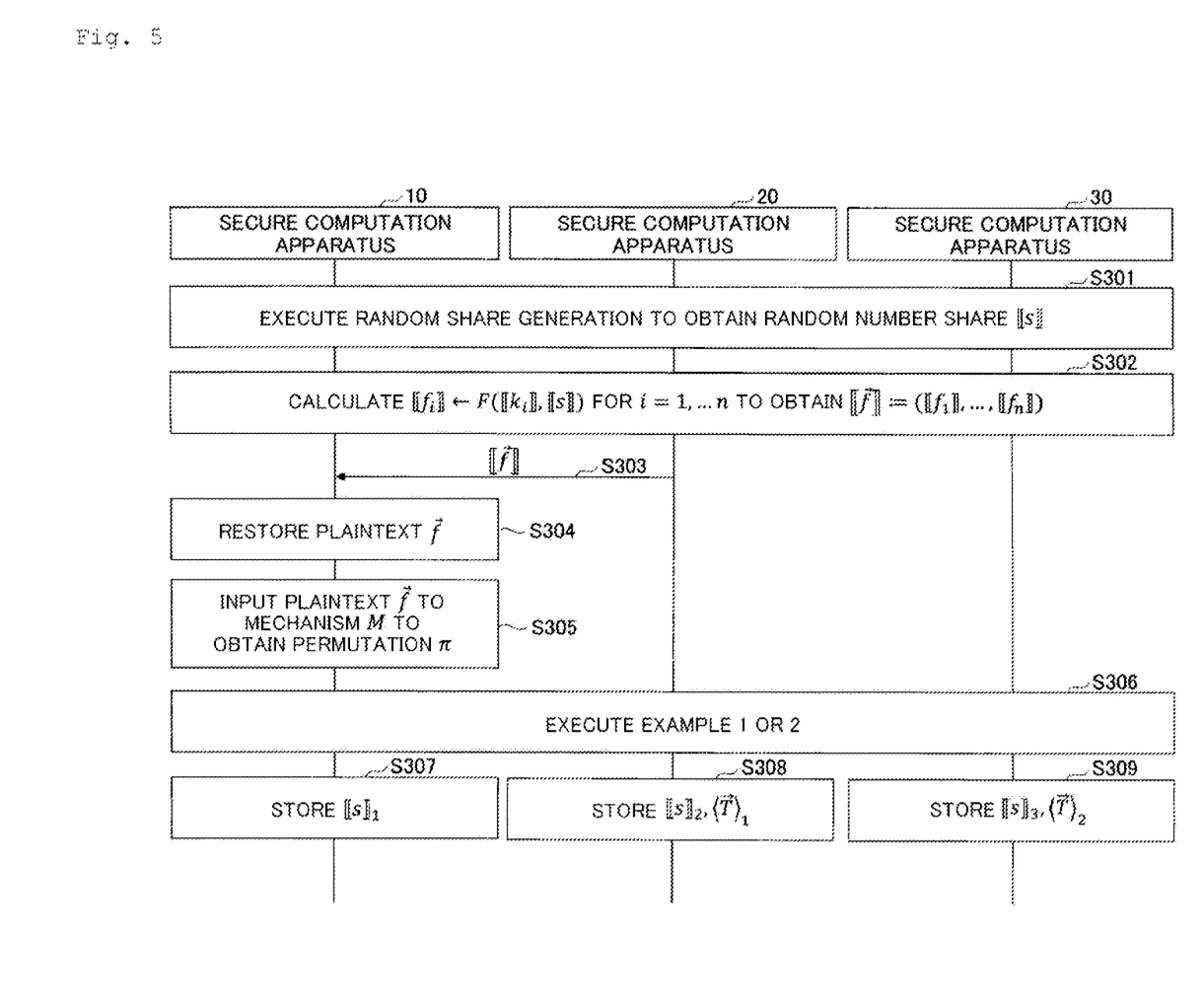
FIG. 5 is a sequence diagram illustrating Example 3.

This example is an extension of the concealed vector permutation described in Examples 1 and 2, and a method in which $P_1$ generates the permutation $\pi$ will be described with reference to FIG. 5. FIG. 5 is a sequence diagram illustrating Example 3. It should be noted that Examples 1 and 2 do not limit the method of generating permutation $\pi$.

In the present embodiment, it is assumed that any pseudo-random function F capable of secure computation is shared among all parties in advance, and at least $P_1$ has any mechanism M that uniquely computes the permutation from a plaintext value of an output of F. Here, the mechanism M is a device or algorithm that outputs bijection $\pi: \{1, \ldots, m\} \to \{1, \ldots, m\}$ (here, $n \le m$) when a vector $(f_1, \ldots, f_n)$ is input, and outputs $\pi(i)$ when a value fi is input. As the mechanism M, it is possible to use, for example, cuckoo hashing described in Reference 5, but the present invention is not limited thereto, and it is possible to use any device or algorithm as long as the device or algorithm has properties similar to cuckoo hashing. In some mechanisms including cuckoo hashing, a case in which an output of the pseudo-random function is multiple values $f_i^{(1)}, \ldots, f_i^{(l)}$ (here, l is a lowercase letter of L), and an output when this is input to M is multiple values $\pi^{(1)}(i), \ldots, \pi^{(l)}(i)$ (here, l is a lowercase of L) is conceivable, but such a case can be used for the present example.

In the present example, $[D_i] = ([k_i], *)$, and a share of any concealed vector held (or input) by all parties is $[\vec{D}] := ([D_1], \ldots, [D_n])$. However, it is assumed that $k_i$ functions as a search key for data reference described in Example 4, and that each $D_i$ has a different $k_i$. Further, * is any type, size, and number of data, but in principle, it is assumed to be a share.

First, the secure computation processing unit 101 of the secure computation apparatus 10, the secure computation processing unit 201 of the secure computation apparatus 20, and the secure computation processing unit 301 of the secure computation apparatus 30 execute random share generation to obtain a random number share [s] (S301). That is, all parties execute the random share generation and $P_1$, $P_2$, and $P_3$ obtain shares $[s]_1$, $[s]_2$, and $[s]_3$ respectively.

Next, the secure computation processing unit 101 of the secure computation apparatus 10, the secure computation processing unit 201 of the secure computation apparatus 20, and the secure computation processing unit 301 of the secure computation apparatus 30 calculate $[f_i] \leftarrow F([k_i], [s])$ for $i=1, \ldots, n$ to obtain $[\vec{f}] := ([f_1], \ldots, [f_n])$ (S302). That is, all parties calculate $[f_i] \leftarrow F([k_i], [s])$ for $i=1, \ldots, n$ to obtain $[\vec{f}] := ([f_1], \ldots, [f_n])$. Accordingly, $P_1$, $P_2$, and $P_3$ obtain shares $[\vec{f}]_1$, $[\vec{f}]_2$, and $[\vec{f}]_3$, respectively.

Next, the secure computation processing unit 201 of the secure computation apparatus 20 transmits its own share $[\vec{f}]_2$ to the secure computation apparatus 10 (S303). However, the secure computation processing unit 301 of the secure computation apparatus 30 may transmit its own share $[\vec{f}]_3$ to the secure computation apparatus 10. That is, either $P_2$ or $P_3$ may transmit its own share $[\vec{f}]$ to $P_1$.

The secure computation processing unit 101 of the secure computation apparatus 10 restores $\vec{f}$ using its own share $[\vec{f}]_1$ and the share $[\vec{f}]$ transmitted from the secure computation apparatus 20 (or the secure computation apparatus 30) (S304).

Next, the secure computation processing unit 101 of the secure computation apparatus 10 inputs the plaintext $\vec{f}$ to the mechanism M to obtain the permutation $\pi$ (S305).

Thereafter, the secure computation processing unit 101 of the secure computation apparatus 10, the secure computation processing unit 201 of the secure computation apparatus 20, and the secure computation processing unit 301 of the secure computation apparatus 30 execute the concealed vector permutation described in Example 1 or 2 (S306). Accordingly, $P_2$ obtains $<\vec{T}>_1$, and $P_3$ obtains $<\vec{T}>_2$. Here, when a value range m of the bijection $\pi$ is n<m, a share of dummy data is added so that a length of $[\vec{D}]$ becomes m in all parties before the concealed vector permutation described in Example 1 or 2 is executed. The dummy data used here may have any value as long as the dummy data satisfies that "the search key is different from any $k_i$ included in $\vec{D}$".

The secure computation processing unit 101 of the secure computation apparatus 10 stores $[s]_1$ in the storage unit 102 (S307). Further, the secure computation processing unit 201 of the secure computation apparatus 20 stores $[s]_2$ and $<\vec{T}>_1$ in the storage unit 202 (S308). Similarly, the secure computation processing unit 301 of the secure computation apparatus 30 stores $[s]_3$ and $<\vec{T}>_2$ in the storage unit 302 (S309).

According to the above protocol, construction of any data structure (reference position concealment vector) including the cuckoo hash table described in Reference 5 and the like can be realized mainly by one-time permutation. In addition, since $P_1$, which knows the permutation $\pi$, does not have the vector $<\vec{T}>$, $P_1$ cannot observe the data reference (vector reference) described in Example 4, making it impossible to identify the reference. Therefore, as described in Example 1, according to the present embodiment, it is possible to efficiently obtain a secure reference position concealment vector.

Example 4

Figure 6:
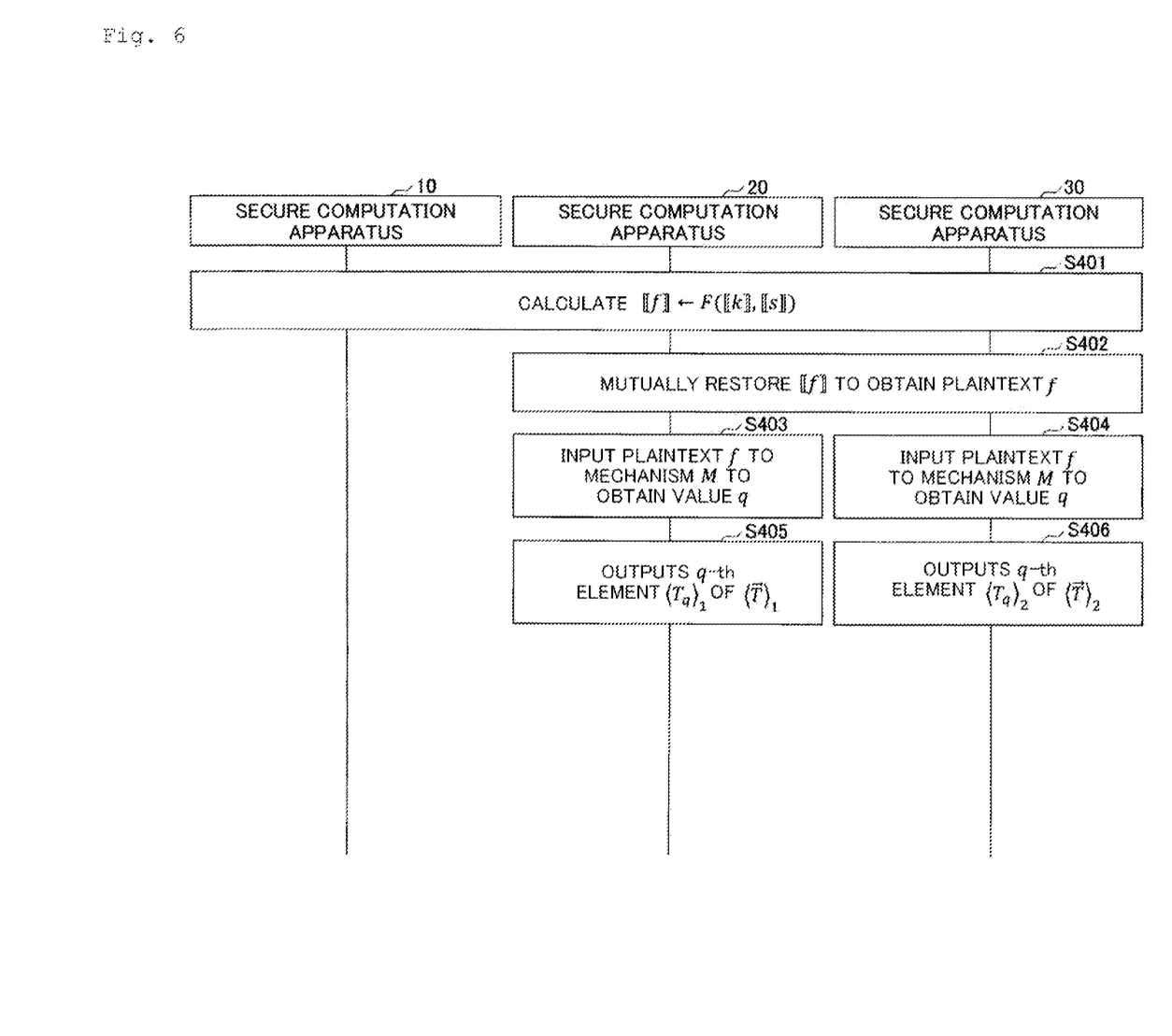
FIG. 6 is a sequence diagram illustrating Example 4.

In the present embodiment, a method of referring to the vector $<\vec{T}>$ obtained in Example 3 will be described with reference to FIG. 6. FIG. 6 is a sequence diagram illustrating Example 4. In the present example, it is assumed that a pseudo-random function F and a mechanism F that are substantially the same as those used in Example 3 are shared among all parties in advance.

Hereinafter, a case in which a tripartite share [k] of a certain search key is input and a bipartite share $<D>=(<k>, *)$ of data matching the search key is output will be described.

First, the secure computation processing unit 101 of the secure computation apparatus 10, the secure computation processing unit 201 of the secure computation apparatus 20, and the secure computation processing unit 301 of the secure computation apparatus 30 calculate $[f] \leftarrow F([k], [s])$ (S401). That is, all parties calculate $[f] \leftarrow F([k], [s])$. Accordingly, each $P_i$ ($i=1, 2, 3$) has $[f]_i$.

Next, the secure computation processing unit 201 of the secure computation apparatus 20 and the secure computation processing unit 301 of the secure computation apparatus 30 mutually restore [f] to obtain a plaintext f (S402). That is, $P_2$ transmits $[f]_2$ of $P_2$ to $P_3$. Similarly, $P_3$ transmits $[f]_3$ of $P_3$ to $P_2$. $P_2$ restores f using $[f]_2$ of $P_2$ and $[f]_3$ transmitted from $P_3$. Similarly, $P_3$ restores f using $[f]_3$ of $P_3$ and $[f]_2$ transmitted from $P_2$.

Next, the secure computation processing unit 201 of the secure computation apparatus 20 inputs the plaintext f to the mechanism M to obtain a value q (S403). Similarly, the secure computation processing unit 301 of the secure computation apparatus 30 inputs the plaintext f to the mechanism M to obtain the value q (S404). That is, $P_2$ and $P_3$ independently input the plaintext f to the mechanism M to obtain the value q.

The secure computation processing unit 201 of the secure computation apparatus 20 outputs a q-th element $<T_q>_1$ of $<\vec{T}>_1$ (S405). Similarly, the secure computation processing unit 301 of the secure computation apparatus 30 outputs a q-th element $<T_q>_1$ of $<\vec{T}>_2$ (S406). That is, $P_2$ and $P_3$ independently output the q-th element $<T_q>$ of $<\vec{T}>$.

In this case, when data $[D_i]=([k_i], *)$ such that $k_i=k$ is included in $[\vec{D}]$, $<T_q>=<D_i>$ in which $q=\pi(i)$ can be correctly referred to by using the fact that a calculation result of the pseudo-random function is also $f_i=f$. Further, in this case, since $P_2$ and $P_3$ do not know the entire permutation $\pi$ or vector $(f_1, \ldots, f_n)$, it is difficult to identify a reference point (that is, an index i) in an original vector even when only f and q are observed. Further, when the mechanism M always maps any output f of the pseudo-random function F to a value range $\{1, \ldots, m\}$, any element $T_q$; $q \in \{1, \ldots, m\}$ of $\vec{T}$ is also referred to for unauthorized reference such that k of the input is not included in an original data vector $\vec{D}$, and there is resistance to an attack attempting to identify an index by intentionally making unauthorized reference.

When the pseudo-random function and the mechanism output multiple values as described in Example 3, $P_2$ and $P_3$ obtain multiple values $q^{(1)}, \ldots, q^{(l)}$ (here, l is a lowercase letter of case L). In this case, in S405 and S406, all elements $$\langle T_{q^{(1)}} \rangle, \ldots, \langle T_{q^{(\ell)}} \rangle \qquad \text{[Math. 8]}$$

are output. In this case, desired data $<D>=(<k>, *)$ is equivalent to any one element.

$$\langle T_{q^{(i)}} \rangle \qquad \text{[Math. 9]}$$

Therefore, each party can also select and output a specific element from all the elements by using any operations such as an equality determination or secure computation, for example.

Conclusion

As described above, with the secure computation system 1 according to the present embodiment, it is possible to efficiently apply any permutation $\pi$ of $P_1$ to the vector while concealing the permutation $\pi$ for $P_2$ and $P_3$ by using asymmetry of information for each party in secure computation of three parties, and to achieve higher security than that in the related art because $P_1$ does not have the vector after permutation. Further, it is possible to construct any data in which the reference position of the vector can be concealed by using such a permutation. Here, asymmetry of information for each party indicates that the information is asymmetric between the party $P_1$ having the permutation for the vector and the parties $P_2$ and $P_3$ having the vector itself after the permutation. This also indicates that information is asymmetric between the parties $P_2$ and $P_3$.

For example, a vector permutation method described in Reference 6 assumes that the permutation is concealed for all parties, whereas in the present embodiment, $P_1$ has any plaintext permutation $\pi$. Therefore, in Reference 6, it is necessary to allow an extra communication traffic cost or add a new process in order to perform any permutation not limited to random permutation, whereas in the present embodiment, it is possible to perform any permutation without any restrictions.

Further, for example, a vector permutation method described in Reference 7 has a wide range of applicable permutation as in the present embodiment because one party has any plaintext permutation, whereas the party having permutation also obtains the vector after permutation. Therefore, in Reference 7, the reference position can be concealed for the parties having the permutation. With respect to the above, in the present embodiment, since only $P_2$ and $P_3$ have the vector after the permutation, and $P_1$ having the permutation does not have the vector after the permutation as described above, it is possible to conceal the reference position for $P_1$ having the permutation.

The present invention is not limited to the specifically disclosed embodiments, and various modifications, changes, combinations with known techniques, and the like can be made without departing from the definition of the claims.

REFERENCES

Reference 1: A. Shamir. How to share a secret. Commun. ACM, Vol. 22, No. 11, pp. 612-613, 1979.

Reference 2: M. Ito, A. Saito, and T. Nishizeki. Secret sharing schemes realizing general access structures. Proceedings of the IEEE Global Telecommunication Conference, Globecom 87, pp. 99-102, 1987.

Reference 3: Naoto Kiribuchi, Dai Igarashi, koki Hamada, Ryo Kikuchi. Programmable secure computation library MEVAL3. Symposium on Cryptography and Information Security (SCIS) 2018 Proceedings (2018).

Reference 4: K. Chida, K. Hamada, D. Ikarashi, R. Kikuchi, and B. Pinkas. High-throughput secure AES computation. In WAHC@CCS 2018, pages 13-24, 2018.

Reference 5: A. Kirsch, M. Mitzenmacher, and U. Wieder. More robust hashing: Cuckoo hashing with a stash. In ESA, pages 611-622, 2008.

Reference 6: K. Chida, K. Hamada, D. Ikarashi, R. Kikuchi, N. Kiribuchi, B. Pinkas. An efficient secure threeparty sorting protocol with an honest majority. Cryptologye-Print Archive, Report 2019/695 (2019), https://eprint.iacr.org/2019/695

Reference 7: P. Mohassel, P. Rindal, and M. Rosulek. Fast database joins and PSI for secret shared data. Proceedings of the 2020 ACM SIGSAC Conference on Computer and Communications Security (CCS '20). Association for Computing Machinery, New York, NY, USA, 1271-1287. 2020.

REFERENCE SIGNS LIST 1 secure computation system
10, 20, 30 secure computation apparatus
101, 201, 301 secure computation processing unit
102, 202, 302 storage unit
40 communications network
500 computer
501 input device
502 display device
503 external I/F
503a recording medium
504 communication I/F
505 processor
506 memory device
507 bus

The invention claimed is:

1. A secure computation system including a first secure computation apparatus, a second secure computation apparatus, and a third secure computation apparatus each having a tripartite share of a concealed input vector,
wherein the first secure computation apparatus includes
a processor; and
a memory storing program instructions that cause the processor to:
convert its own tripartite share into a bipartite share with the third secure computation apparatus;
calculate a third vector obtained by subtracting, from a result of applying its own permutation to its own bipartite share, a result of applying a second permutation determined according to the permutation to a first vector determined by a predetermined method and a second vector determined by a predetermined method; and
transmit the third vector and the second permutation to the second secure computation apparatus,
the third secure computation apparatus includes
a processor; and
a memory storing program instructions that cause the processor to
convert its own tripartite share into a bipartite share with the first secure computation apparatus;
calculate a fourth vector obtained by adding the first vector to a result of applying a first permutation determined according to the permutation to its own bipartite share;
transmit the fourth vector to the third secure computation apparatus;
set the second vector as a bipartite share, with the second secure computation apparatus, of a result of applying the permutation to the input vector, and
the second secure computation apparatus includes
a processor; and
a memory storing program instructions that cause the processor to set a vector obtained by adding a result of applying the second permutation to the fourth vector to the third vector, as a bipartite share, with the third secure computation apparatus, of the result of applying the permutation to the input vector.

2. The secure computation system according to claim 1, wherein the processor of the first secure computation apparatus is further configured to:
randomly determine the first permutation and the second permutation such that synthetic mapping between the first permutation and the second permutation is the permutation; and
randomly determine the first vector and the second vector having the same size as its own bipartite share, and
the processor of the first secure computation apparatus transmits the first permutation, the first vector, and the second vector to the third secure computation apparatus.

3. The secure computation system according to claim 1, wherein the processor of the first secure computation apparatus is further configured to:
determine the first permutation, the first vector, and the second vector, using a pseudo-random number generator shared with the third secure computation apparatus and input data to the pseudo-random number generator; and
determine synthesis mapping between inverse mapping of the first permutation and the permutation as the second permutation, and
the processor of the third secure computation apparatus is further configured to determine the first permutation, the first vector, and the second vector, using a pseudorandom number generator shared with the first secure computation apparatus and input data to the pseudorandom number generator.

4. The secure computation system according to claim 1, wherein the first secure computation apparatus, the second secure computation apparatus, and the third secure computation apparatus share a pseudo-random function capable of secure computation, and
the processor of the first secure computation apparatus is further configured to:
generate a tripartite share of a random number through random share generation between the second secure computation apparatus and the third secure computation apparatus;
calculate a tripartite share of a vector of a value of the pseudo-random function with the tripartite share of the random number and each of predetermined tripartite shares included in each element of the input vector as inputs through secure computation between the second secure computation apparatus and the third secure computation apparatus;

restore the vector of the value of the pseudo-random function, using the tripartite share of the vector of the value of the pseudo-random function transmitted from the second secure computation apparatus or the third secure computation apparatus and its own tripartite share of the vector of the value of the pseudo-random function; and receive the vector of the value of the pseudo-random function as an input and generate the permutation, using a predetermined mechanism.

5. The secure computation system according to claim 4, wherein the processor of the second secure computation apparatus is further configured to:

calculate a tripartite share of the value of the pseudo-random function with the tripartite share of the random number and a tripartite share of a search key for the input vector as inputs through secure computation between the first secure computation apparatus and the third secure computation apparatus;

transmit its own tripartite share of the value of the pseudo-random function to the third secure computation apparatus;

restore the value of the pseudo-random function, using the tripartite share of the value of the pseudo-random function transmitted from the third secure computation apparatus and its own tripartite share of the value of the pseudo-random function; and generate a value indicating a reference position for a bipartite share, with the third secure computation apparatus, of the result of applying the permutation to the input vector, using the mechanism with the value of the pseudo-random function as an input, and the processor of the third secure computation apparatus is further configured to:

calculate the tripartite share of the value of the pseudo-random function with the tripartite share of the random number and the tripartite share of the search key for the input vector as inputs through secure computation between the first secure computation apparatus and the second secure computation apparatus;

transmit its own tripartite share of the value of the pseudo-random function to the second secure computation apparatus;

restore the value of the pseudo-random function, using the tripartite share of the value of the pseudo-random function transmitted from the second secure computation apparatus and its own tripartite share of the value of the pseudo-random function; and generate a value indicating a reference position for a bipartite share, with the second secure computation apparatus, of the result of applying the permutation to the input vector, using the mechanism with the value of the pseudo-random function as an input.

6. A secure computation apparatus sharing a tripartite share of a concealed input vector between a first secure computation apparatus and a second other secure computation apparatus, the secure computation apparatus comprising:

a processor; and a memory storing program instructions that cause the processor to:

convert its own tripartite share into a bipartite share with the second secure computation apparatus;

randomly determine a first permutation and a second permutation such that synthetic mapping between the first permutation and the second permutation is its own permutation;

randomly determine a first vector and a second vector having the same size as its own bipartite share;

calculate a third vector obtained by subtracting a result of applying the second permutation to the first vector, and the second vector from a result of applying the permutation to its own bipartite share;

transmit the third vector and the second permutation to the first secure computation apparatus; and transmit the first permutation, the first vector, and the second vector to the second secure computation apparatus.

7. A method for use in a secure computation system including a first secure computation apparatus, a second secure computation apparatus, and a third secure computation apparatus each having a tripartite share of a concealed input vector, wherein the first secure computation apparatus executes
converting its own tripartite share into a bipartite share with the third secure computation apparatus;
calculating a third vector obtained by subtracting, from a result of applying its own permutation to its own bipartite share, a result of applying a second permutation determined according to the permutation to a first vector determined by a predetermined method and a second vector determined by a predetermined method; and
transmitting the third vector and the second permutation to the second secure computation apparatus, the third secure computation apparatus executes
converting its own tripartite share into a bipartite share with the first secure computation apparatus;
calculating a fourth vector obtained by adding the first vector to a result of applying a first permutation determined according to the permutation to its own bipartite share;
transmitting the fourth vector to the third secure computation apparatus;
setting the second vector as a bipartite share with the second secure computation apparatus of a result of applying the permutation to the input vector, and the second secure computation apparatus executes setting a vector obtained by adding a result of applying the second permutation to the fourth vector to the third vector, as a bipartite share with the third secure computation apparatus of the result of applying the permutation to the input vector.

8. A non-transitory computer-readable recording medium having stored therein a program for causing a computer to perform the method according to claim 7.

* * * * *